United States Patent
Dubeyko et al.

(10) Patent No.: US 11,544,223 B2
(45) Date of Patent: Jan. 3, 2023

(54) WRITE OPERATION VERIFICATION METHOD AND APPARATUS

(71) Applicant: Western Digital Technologies, Inc., San Jose, CA (US)

(72) Inventors: Viacheslav Dubeyko, San Jose, CA (US); Adam Manzanares, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 511 days.

(21) Appl. No.: 16/455,564

(22) Filed: Jun. 27, 2019

(65) Prior Publication Data
US 2019/0317920 A1 Oct. 17, 2019

Related U.S. Application Data

(63) Continuation of application No. 15/146,685, filed on May 4, 2016, now Pat. No. 10,380,069.

(51) Int. Cl.
*G06F 16/00* (2019.01)
*G06F 16/16* (2019.01)
(Continued)

(52) U.S. Cl.
CPC ........ *G06F 16/164* (2019.01); *G06F 11/1435* (2013.01); *G06F 16/11* (2019.01); *G06F 16/2365* (2019.01)

(58) Field of Classification Search
None
See application file for complete search history.

(56) References Cited

U.S. PATENT DOCUMENTS

| | | |
|---|---|---|
| 6,584,582 B1 | 6/2003 | O'Connor |
| 6,732,124 B1 | 5/2004 | Koseki |

(Continued)

FOREIGN PATENT DOCUMENTS

| | | |
|---|---|---|
| CN | 101640581 A | 2/2010 |
| CN | 102521010 A | 6/2012 |

(Continued)

OTHER PUBLICATIONS

Park, J.H., "the file system and file recovery (the file system survey)", (UCS) LAB, SeoulTech, pp. 1-114 (2012).

(Continued)

*Primary Examiner* — Thu Nguyet T Le
(74) *Attorney, Agent, or Firm* — Morgan, Lewis & Bockius LLP (57) ABSTRACT

A verification architecture described according to embodiments of the present invention validates changes made to metadata and may comprise one or more subsystems and phases. According to some embodiments, the "mkfs" volume creation utility works in cooperation with the device driver to create a file system volume by means of reservation and initialization space for metadata structures inside the device's partition that is reserved for the specific file system volume. The storage device uses a verified area legend when checking write requests after the file system volume has been created. The verified area legends may be stored in a dedicated partition or inside the master boot record (MBR) or Globally Unique Identifier (GUID) partition table (GPT) or special memory chip (NAND flash, for example). Write requests that overlap with any extent of reserved metadata area must be verified to prevent metadata corruption.

20 Claims, 4 Drawing Sheets

(51) Int. Cl.
  *G06F 16/11* (2019.01)
  *G06F 16/23* (2019.01)
  *G06F 11/14* (2006.01)

(56) References Cited

U.S. PATENT DOCUMENTS

| | | | |
|---|---|---|---|
| 7,206,785 | B1 | 4/2007 | Stephens |
| 7,305,393 | B2 | 12/2007 | Seeger et al. |
| 7,430,570 | B1 | 9/2008 | Srinivasan et al. |
| 7,529,745 | B2 | 5/2009 | Ahluwalia et al. |
| 7,640,412 | B2 | 12/2009 | Molaro et al. |
| 8,086,585 | B1 * | 12/2011 | Brashers ............ G06F 16/1774 707/705 |
| 8,555,022 | B1 | 10/2013 | Edwards |
| 9,250,823 | B1 | 2/2016 | Kamat |
| 9,256,373 | B1 | 2/2016 | Liang |
| 9,529,735 | B2 | 12/2016 | Hashimoto |
| 9,804,966 | B1 | 10/2017 | Sadanandan |
| 2003/0163553 | A1 | 8/2003 | Kitamura |
| 2004/0186946 | A1 | 9/2004 | Lee |
| 2004/0210607 | A1 * | 10/2004 | Manchanda ......... G06F 16/283 |
| 2006/0112096 | A1 | 5/2006 | Ahluwalia et al. |
| 2006/0117056 | A1 | 6/2006 | Havewala et al. |
| 2006/0129614 | A1 | 6/2006 | Kim et al. |
| 2006/0282471 | A1 | 12/2006 | Mark et al. |
| 2007/0016695 | A1 | 1/2007 | Rabbers |
| 2007/0028293 | A1 | 2/2007 | Boerries |
| 2009/0177721 | A1 * | 7/2009 | Mimatsu ............ H04L 67/322 |
| 2009/0327624 | A1 * | 12/2009 | Tamura ............. G06F 11/1435 711/158 |
| 2010/0023847 | A1 | 1/2010 | Morita |
| 2010/0125586 | A1 | 5/2010 | VanVieck |
| 2010/0191779 | A1 | 7/2010 | Hinrichs |
| 2011/0099461 | A1 | 4/2011 | Rajpal |
| 2011/0106802 | A1 | 5/2011 | Pinkney et al. |
| 2012/0110043 | A1 | 5/2012 | Cavet |
| 2012/0110281 | A1 | 5/2012 | Green |
| 2013/0067148 | A1 | 3/2013 | Takagi |
| 2013/0238659 | A1 | 9/2013 | Roitman et al. |
| 2013/0238876 | A1 | 9/2013 | Fiske |
| 2013/0246709 | A1 | 9/2013 | Segelken et al. |
| 2014/0040540 | A1 | 2/2014 | Pruthi |
| 2014/0188957 | A1 | 7/2014 | Hosoi |
| 2014/0258599 | A1 | 9/2014 | Rostoker et al. |
| 2015/0347492 | A1 | 12/2015 | Dickie |
| 2016/0150047 | A1 | 5/2016 | O'Hare |
| 2017/0255415 | A1 | 9/2017 | Dubeyko |
| 2017/0277715 | A1 | 9/2017 | Strauss |
| 2017/0316027 | A1 | 11/2017 | Mondal |
| 2017/0316047 | A1 | 11/2017 | Dubeyko |

FOREIGN PATENT DOCUMENTS

| | | |
|---|---|---|
| CN | 104038486 | 9/2014 |
| CN | 104268758 | 1/2015 |
| EP | 2689213 A1 | 1/2014 |
| KR | 100308873 B1 | 11/2001 |
| KR | 20140026821 A | 3/2014 |
| WO | 2008093961 A1 | 8/2008 |
| WO | WO 2014/147816 | 9/2014 |

OTHER PUBLICATIONS

BC—Namespaces and Naming Conventions (BC-CTS-NAM), 2001, SAP AG, Release 4.6C, 26 pages.

How can I create an empty namespace object without overwriting another object with the same name?, Feb. 24, 2012, retrieved from https://stackoverflow.com/questions/9425943/how-can-i-create-an-empty-namespace-object-without-overwriting-another-object-wi, 9 pages.

Metadata Invariants: Checking and Inferring Metadata Coding Conventions, retrieved from http://people.cs.vt.edu/tilefich/papers/icse2012.pdf, Jun. 2, 2012, 11 pages.

Metz, Creating Higher Performance Solid State Storage with Non-Volatile Memory Express (NVMe), Data Storage Innovation Conference, 2015, 9 pages.

Recon http://www.eecg.toronto.edu/~asvin/publications/recon-fs-consistency-runtime.pdf, Proceedings of the 10th USENIX conference on File and Storage Technologies, Feb. 14-17, 2012, 16 pages.

Recon: Verifying File System Consistency at Runtime, retrieved from https://www.usenix.org/legacy/events/fast/poster_refereed/Fryerposter.pdf, Feb. 16, 2012, 1 page.

XFS Self Decribing Metadata, retrieved from https://www.kernel.org/doc/Documentation/filesystems/xfs-self-describing-metadata.txt, Apr. 24, 2013, 6 pages.

* cited by examiner

WRITE OPERATION VERIFICATION METHOD AND APPARATUS

CROSS-REFERENCE TO RELATED APPLICATIONS

This application is a continuation application of U.S. application Ser. No. 15/146,685, entitled "GENERALIZED WRITE OPERATIONS VERIFICATION METHOD," filed on May 4, 2016, now U.S. Pat. No. 10,380,069, the entirety of which is incorporated herein by reference. This patent application is related to: the commonly-assigned U.S. patent application Ser. No. 15/058,538, entitled "METHOD OF PREVENTING METADATA CORRUPTION BY USING A NAMESPACE AND A METHOD OF VERIFYING CHANGES TO THE NAMESPACE," filed on Mar. 2, 2016; now U.S. Pat. No. 10,310,925, and the commonly-assigned U.S. patent application Ser. No. 15/140,241, entitled "GENERALIZED VERIFICATION SCHEME FOR SAFE METADATA MODIFICATION," filed on Apr. 27, 2016. The foregoing applications are herein incorporated by reference in entirety for all purposes.

FIELD

Embodiments of the present invention generally relate to the field of data storage systems. More specifically, embodiments of the present invention relate to systems and methods for preserving the consistency of a file system, including preserving the consistency of data storage metadata.

BACKGROUND

Metadata is a set of data that describes the organization of user data or other metadata on a data storage partition or a file system volume. Preserving file system metadata is critical to the operation of modern file systems and helps ensure that user data written to the file system volume will be accessible when requested. However, occasionally, end user workloads, end user mistakes, malicious operations, or bugs in a file system driver may cause improper behavior that can result in metadata corruption, especially in unstable file systems. It is possible to encounter metadata corruptions even in mature file systems.

When a file system's metadata becomes corrupted, special tools such as the "fsck" (file system consistency check) system utility (in Unix-like operating systems) or backup/restore software are often used to attempt to recover the file system data. However, using the fsck utility is a very time-consuming operation and cannot guarantee that a corrupted file system's data will be recovered. Furthermore, such tools can be used only when the file system is in an unmounted (e.g., offline) state. As such, preventing metadata corruption is a more beneficial approach than detecting corruption and attempting to recover corrupted data.

SUMMARY

Methods and systems for preventing metadata corruption on a storage device are described herein. Embodiments of the present invention utilize a verification architecture to validate changes made to metadata and may comprise one or more subsystems and phases. A file system volume is created using a file system creation utility (e.g., "mkfs" in Unix-like operating systems) through reservation and initialization of space for metadata structures inside the device's partition. The space for metadata structures inside the device's partition is reserved for the specific file system volume. Every reserved metadata area should be described by an area legend. Verified area legends are used by a device driver (host side) or storage device controller (e.g., Application-specific integrated circuit (ASIC) or Field-programmable gate array (FPGA)) when checking metadata modifications after the volume has been created. The verified area legends may be stored in a dedicated partition, inside the master boot record (MBR) or Globally Unique Identifier (GUID) partition table (GPT), or on a special memory chip. Write requests that overlap with any reserved metadata area on a file system volume must be verified to prevent metadata corruption.

According to one embodiment, a method of validating a write request to a storage device to prevent corruption of metadata is disclosed. The write request includes a logical block address, a magic signature, and a data type flag. The method includes determining that the logical block address of the write request overlaps an existing extent of a verified area of the storage device; responsive to the magic signature matching an expected magic signature of a legend of the verified area, determining that the magic signature is valid; responsive to the data type flag comprising a metadata type, determining that a number of blocks of the write request is valid; responsive to a size of the write request being equal to a multiple of a node size of the legend of the verified area, determining that the size of the write request is valid; and responsive to the write request comprising a valid magic signature, a valid number of blocks, and a valid size, determining that the write request is valid.

According to another embodiment, an apparatus for validating a write request to prevent corruption of metadata is disclosed. The apparatus includes a storage device and a processor communicatively coupled to the storage device that is configured to analyze the write request, where the write request includes a logical block address, a magic signature, and a data type flag; determine that the logical block address of the write request overlaps an existing extent of a verified area of the storage device; responsive to the magic signature matching an expected magic signature of a legend of the verified area, determine that the magic signature is valid; responsive to the data type flag comprising a metadata type, determine that a number of blocks of the write request is valid, responsive to a size of the write request being equal to a multiple of a node size of the legend of the verified area, determine that the size of the write request is valid; and responsive to the write request comprising a valid magic signature, a valid number of blocks, and a valid size, determine that the write request is valid.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternatives, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein describing the operations of this method, such steps and sequencing are exemplary. Embodiments are well suited to performing various other steps or variations of the steps recited in the flowchart (e.g., FIG. 5) of the figures herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Figure 1:
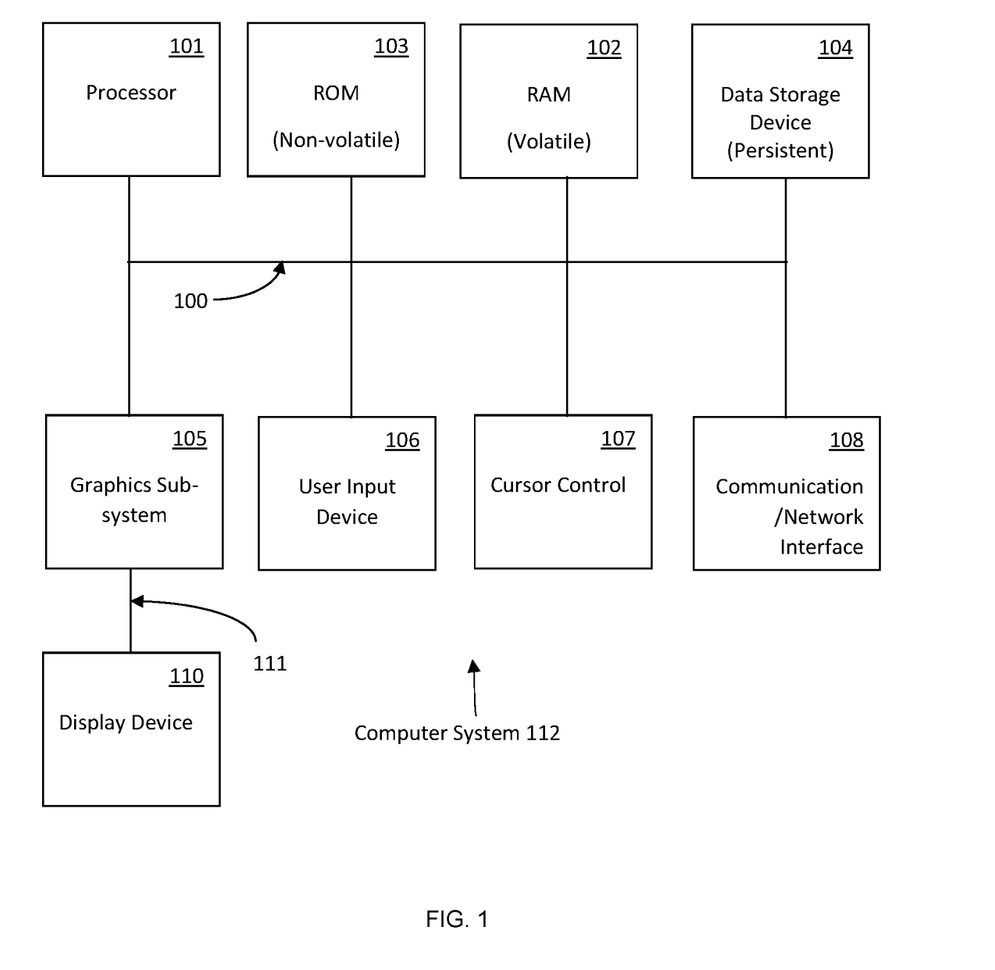
FIG. 1 is a block diagram of an exemplary computer system upon which embodiments of the present invention may be implemented.

In the example of FIG. 1, the computer system 112 includes a central processing unit (CPU) 101 for running an operating system and/or software applications. Memory 102/103 stores applications and data for use by the CPU 101. Read-Only Memory (ROM) 103 is used for non-volatile storage and may include the system Basic Input/Output System (BIOS) for hardware initialization during the booting process (e.g., power-on startup) and to provide runtime services for operating systems. Random Access Memory (RAM) 102 provides volatile storage. Data storage device 104 provides non-volatile storage for applications and data on one or more partitions and/or logical volumes and may include one or more hard disk drives, solid-state drives (SSDs), or storage drives that are based on next generation of non-volatile memory (NVM). The optional user input devices 106 and cursor control 107 include devices that communicate user input from one or more users to the computer system 112 and may include keyboards, mice, joysticks, cameras, touch screens, and/or microphones.

A communication or network interface 108 allows the computing device 112 to communicate with other computer systems via an electronic communications network, including wired and/or wireless communication and including an Intranet or the Internet. The components of the computer system 112, including the CPU 101, memory 103/102, data storage device 104, user input devices 106, and the display device 110 may be coupled via one or more data buses 100.

In the embodiment of FIG. 1, a graphics sub-system 105 may be coupled with the data bus and the components of the computer system 112. The graphics sub-system may include a physical graphics processing unit (GPU) 105 and graphics memory, or an integrated graphics component of a motherboard/chipset or processor, for example. The graphics sub-system 105 generates pixel data for output images from rendering commands. The physical graphics sub-system 105 can be configured as multiple virtual GPUs that may be used in parallel (concurrently) by a number of applications or processes executing in parallel.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The following description is presented to enable a person skilled in the art to make and use the embodiments of this invention. It is presented in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The verification architecture described according to embodiments of the present invention validates write requests and may comprise one or more subsystems and phases. According to some embodiments, the file system creation utility (e.g., "mkfs" in Unix-like operating systems) creates a file system volume by means of reservation and initialization of space for metadata structures inside the device's partition that is reserved for the specific file system volume, and creates verified area legends for the reserved areas. The storage device controller (e.g., ASIC or FPGA), device driver, or special verification subsystem (host side) uses the verified area legends when checking write requests before applying metadata or user data changes after the file system volume has been created. The verified area legends may be stored in a dedicated partition, inside the master boot record (MBR) or Globally Unique Identifier (GUID) partition table (GPT), or dedicated memory chip (e.g., Not-AND (NAND) flash memory), for example.

According to some embodiments, a write request received by the verification subsystem may include a flag indicating if the write request includes user data or metadata. If the flag of the write request indicates that the write request relates to user data, the verification subsystem prevents the write request from writing to any reserved metadata areas on the file system volume. If the flag of the write request indicates that the write request relates to metadata, the verification subsystem prevents the write request from writing the metadata to a location outside of any reserved metadata areas on the file system volume.

Figure 2:
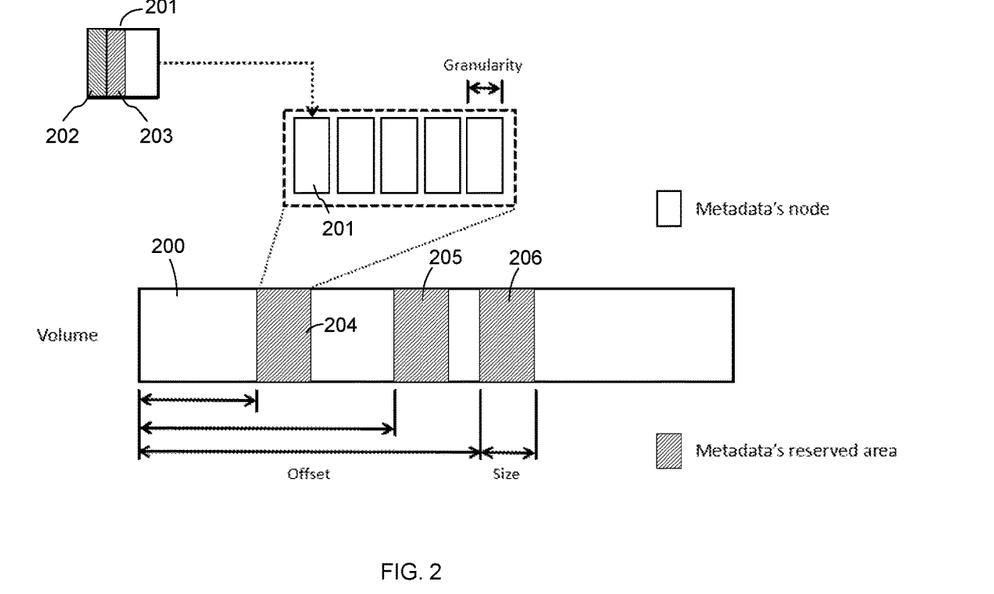
FIG. 2 is a block diagram of an exemplary generalized file system volume comprising areas reserved specifically for metadata according to embodiments of the present invention.

With regard to FIG. 2, an exemplary generalized file system volume 200 is depicted comprising reserved areas 204-206 used for storing metadata records according to embodiments of the present invention. During file system volume creation, a file system creation utility such as the mkfs utility is used to reserve areas 204-206 for metadata structures. The location of the reserved areas can be described using a size value and an offset value relative to the beginning of the volume, or when the storage device has several partitions, relative to the beginning of the whole storage device. Each reserved area comprises a specific number of metadata nodes 201. The size of a reserved area may be defined by the size of the volume, the granularity of metadata nodes in this area, the granularity of metadata items in this area, and the internal organization of metadata items in the metadata structure. The metadata node may contain a number of physical sectors (e.g., 4 KB, 8 KB, 16 KB, 32 KB, 64 KB, etc.). A file system volume may be resized (e.g., expanded or contracted) as necessary. Reserved areas should be equal or proportional in size to other parts of the same metadata structure.

The reserved metadata areas may be conceptualized as a series of nodes (e.g., tree of nodes) or an array of metadata items distributed between blocks of a certain size. As a whole, the metadata structure may represent a sequence of nodes of identical size. Alternatively, the metadata structure may represent a simple table or array distributed between several physical sectors. According to some embodiments of the present invention, the metadata node begins with a header. The header may be used to identify a specific metadata structure. The metadata structure may be identified using magic signature 202, for example. The header may also comprise an identification number 203 that enables the system to analyze an order of nodes in the metadata structure's sequence.

The metadata structure of a file system may be characterized by several elements. First, the metadata structure's magic signature 202 is a special pre-defined binary value that identifies the type of metadata structure. A node size associated with the metadata structure determines the granularity of a portion of the metadata items. Min, default, and max clump size values define the minimum, default, and maximum possible size of a contiguous metadata area for future reservations. A sequence identification number 203 is used to check the order of nodes in the metadata structure's sequence.

Figure 3:
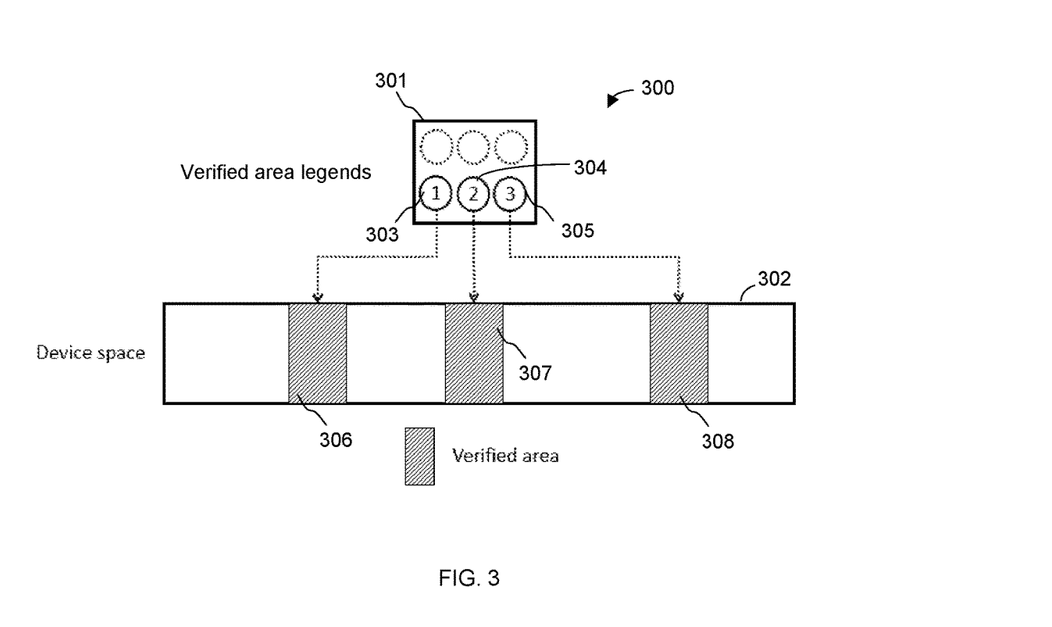
FIG. 3 is a block diagram of a generalized metadata verification architecture according to embodiments of the present invention.

With regard to FIG. 3, a generalized metadata verification architecture 300 is depicted according to embodiments of the present invention. According to some embodiments, the file system volume creation utility (e.g., the mkfs utility) creates a file system volume by means of reservation and initialization of space for metadata structures inside the device's partition that is reserved for the specific file system volume. Verified area legends 303-305 are designed to describe key information about verified metadata areas 306-308 inside of the storage device's partition that is dedicated to the file system volume. The verified area legends are created and handled by the mkfs utility, and stored in a dedicated storage space 301. The dedicated storage space 301 may comprise a dedicated partition or memory chip (e.g., NAND chip), for example. Verified area legends may be created by the file system driver during file system operations or when new free space is needed for metadata records. The verification subsystem of the storage device or the host, uses the verified area legend to verify write requests before making metadata or user data modifications after the file system volume has been created. The verified area legends may be stored in a dedicated partition, inside the master boot record (MBR) or the Globally Unique Identifier (GUID) partition table (GPT), or within a dedicated memory chip (NAND flash memory, for example).

Figure 4:
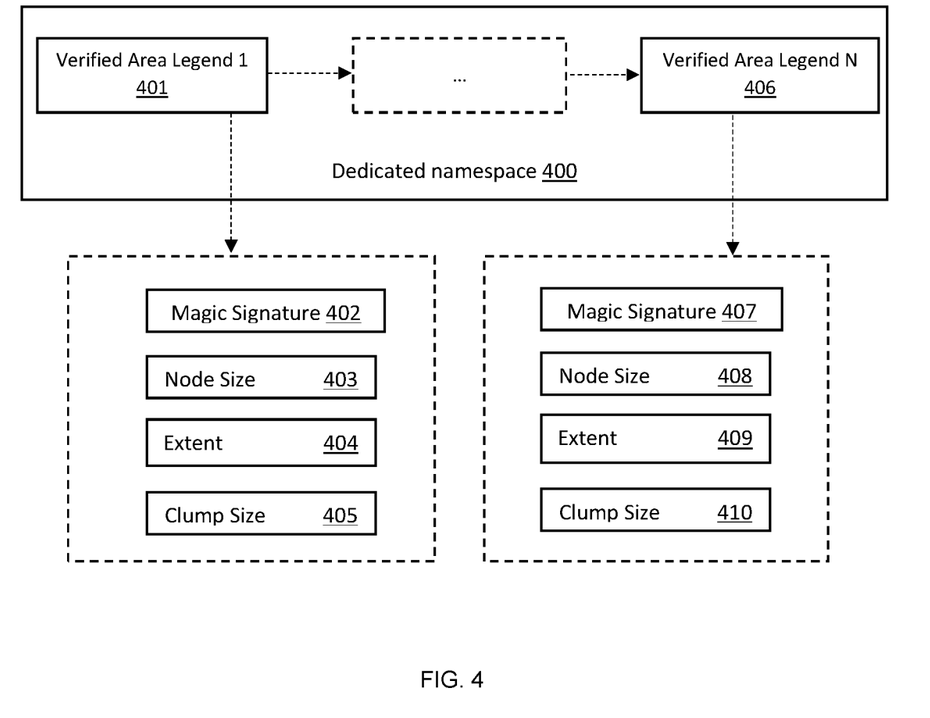
FIG. 4 is a block diagram of an exemplary verified area legend according to embodiments of the present invention.

With regard to FIG. 4, exemplary verified area legends 401 and 406 are depicted according to embodiments of the present invention. The verified area legends 401 and 406 are generated by a mkfs utility or file system driver based on the reserved metadata areas (e.g., size of the metadata areas, etc.), and stored in dedicated namespace 400. Other verified area legends may be present but are not depicted. Verified area legends 401 and 406 describe information about associated verified areas of the device storage's partition. This information is used to validate write requests including metadata or user data prior to writing data to the file system volume. The verified area legends 401/406 may comprise a magic signature 402/407, a node size (e.g., number of bytes) 403/408, an extent of the area 404/409 (e.g., starting block and number of blocks in the area), and a minimal, default, and maximal clump size values 405/410 for future possible metadata space reservations. According to some embodiments, the verified area legend comprises an Extensible Markup Language (XML) format, plain text, or any other structure that is able to store content of verified area legends.

Figure 5:
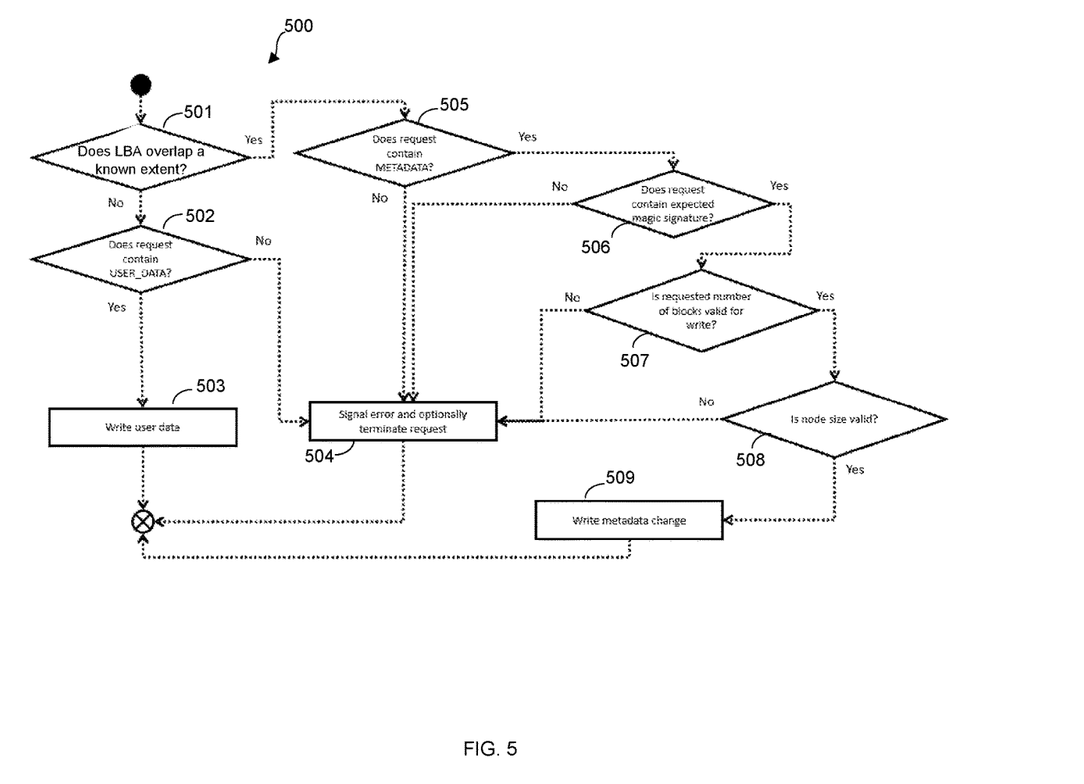
FIG. 5 is a flowchart illustrating steps of an exemplary computer-implemented process for validating write requests according to embodiments of the present invention.

With regard to FIG. 5, a flowchart illustrating an exemplary sequence of steps of a computer-implemented process 500 for validating write requests is depicted according to embodiments of the present invention. A write request may comprise a logical block address (LBA) that references a single logical location on a storage device. Further, the write request comprises a byte stream having a size equal to one or more physical sectors. When an LBA associated with a write request does not overlap an extent of any existing verified area legend contained in the namespace that is associated with the file system volume (step 501), it is determined if the write request comprises writing metadata or user data (e.g., by reading a data type flag "USER_DATA") (step 502). If the write request contains user data, the user data is written to the storage device (step 503). If the write request attempts to write a metadata record outside of any reserved metadata area, an error is signaled and/or the write request terminates (step 504). When an LBA associated with a write request overlaps an extent of any existing verified area into the namespace (step 501), it is determined if the write request contains metadata (e.g., by reading a data type flag "METADATA") (step 505). If the write request does not contain metadata, an error is signaled and/or the write request terminates (step 504).

At step 506, if the write request does contain metadata, it is determined if the write request comprises a valid magic signature (e.g., the expected magic signature), for example, at the beginning of the byte stream. The write request may also include the magic signature as part of service information. The magic signature of the write request is checked against an existing magic signature in the associated metadata area legend to determine if it is the expected magic signature. If a write request does not comprise a valid magic signature (e.g., the expected magic signature), an error is signaled and/or the write request terminates (step 504). If the write request does comprise a valid magic signature, the process continues to step 507.

At step 507, it is determined if the requested number of blocks for the write request is valid. If the byte stream of the write request is located exclusively in the reserved metadata area, the requested number of blocks is valid. If the write request is attempting to store a part of byte stream outside of a metadata reserved area, an error is signaled and/or the write request terminates (step 504). If the write request was determined to be valid in step 507, the process continues to step 508, where it is determined if the size of the write request is valid. The write request size is determined based on the number of physical sectors in the write request. The size of the write request is valid if it is equal to the size of one or more metadata nodes. If the size of the write request is equal to one or more metadata nodes, the file system volume modification complies with all of the constraints of the associated verified area legend, and the metadata can be written to the file system volume (step 509). If the above constraints are not satisfied, an error is signaled and/or the write request terminates (step 504).

Embodiments of the present invention are thus described. While the present invention has been described in particular embodiments, it should be appreciated that the present invention should not be construed as limited by such embodiments, but rather construed according to the following claims.

What is claimed is:

1. An apparatus, comprising:
one or more memories configured to have:
one or more reserved metadata areas; and
a dedicated namespace associated with the one or more reserved metadata areas; and
one or more processors communicatively coupled to the one or more memories, the one or more processors configured to cause:
prior to applying metadata changes:
using one or more verified area legends of the dedicated namespace for verifying a write request, wherein the verifying the write request comprises determining whether a logical block address associated with the write request overlaps an extent of the one or more verified area legends;
when the logical block address overlaps the extent of the one or more verified area legends, determining whether the write request comprises metadata; and
when the write request comprises the metadata, determining whether a requested number of blocks of the write request is located only in the one or more reserved metadata areas; and
when the requested number of the blocks of the write request is located only in the one or more reserved metadata areas, writing the metadata of the write request to the one or more reserved metadata areas,
wherein:
the dedicated namespace is for storing the one or more verified area legends;
the one or more verified area legends are configured to describe information about the one or more reserved metadata areas;
the one or more verified area legends are for being generated based on a size of the one or more reserved metadata areas;
each of the one or more verified area legends is configured to describe a corresponding area of the one or more reserved metadata areas;
each of the one or more verified area legends is configured to indicate a size of a node for a corresponding area of the one or more reserved metadata areas; and
the dedicated namespace is different from the one or more reserved metadata areas.

2. The apparatus of claim 1, wherein the one or more processors are configured to:
when the requested number of the blocks of the write request is located only in the one or more reserved metadata areas, determine that the requested number of the blocks of the write request is valid;
when the requested number of the blocks of the write request is valid, determine whether a size of the blocks of the write request is equal to a multiple of a node size of the one or more verified area legends of the dedicated namespace; and
when the requested number of the blocks of the write request is valid and when the size of the blocks of the write request is equal to the multiple of the node size, write the metadata of the write request to the one or more reserved metadata areas.

3. The apparatus of claim 1, wherein the write request comprises the logical block address, a signature and a data type indication, and wherein the one or more processors are configured to present a notification indicating that the write request is not valid, in response to one or more of: determining that the write request does not comprise metadata based on the data type indication indicating metadata, determining that the signature does not match an expected signature of the one or more verified area legends, determining that the requested number of the blocks of the write request is not valid, or determining that a size of the blocks of the write request is not equal to a multiple of a node size of the one or more verified area legends of the dedicated namespace.

4. The apparatus of claim 1, wherein a file system activity is configured to generate the write request, and wherein the one or more processors are configured to:
responsive to determining the logical block address associated with the write request does not overlap the extent of the one or more verified area legends, determine that the write request comprises user data and not metadata based on a data type indication contained in the write request; and
responsive to determining that the write request comprises the user data, writing the user data to memory.

5. The apparatus of claim 1, wherein a signature contained in the write request comprises a value that identifies a concrete metadata structure.

6. The apparatus of claim 1, wherein when the logical block address associated with the write request overlaps the extent of the one or more verified area legends, the one or more processors are configured to determine whether the write request comprises metadata based on a data type indication signifying metadata that is contained with the write request.

7. The apparatus of claim 1, wherein the one or more processors are configured to cause: when the logical block address overlaps the extent of the one or more verified area legends and the write request does not contain the metadata, providing an indication of an error or terminating the write request.

8. A machine-implemented method for a storage system comprising one or more memories, wherein the one or more memories comprise: one or more reserved metadata areas; and a dedicated namespace associated with the one or more reserved metadata areas, and wherein the machine-implemented method comprises:
prior to applying metadata changes:
using one or more verified area legends of the dedicated namespace for verifying a write request, wherein the verifying the write request comprises determining whether a logical block address associated with the write request overlaps an extent of the one or more verified area legends;
when the logical block address overlaps the extent of the one or more verified area legends, determining whether the write request comprises metadata; and
when the write request comprises the metadata, determining whether a requested number of blocks of the write request is located only in the one or more reserved metadata areas; and
when the requested number of the blocks of the write request is located only in the one or more reserved metadata areas, writing the metadata of the write request to the one or more reserved metadata areas, wherein:
the dedicated namespace stores the one or more verified area legends;
the one or more verified area legends describe information about the one or more reserved metadata areas;
the one or more verified area legends are for being generated based on a size of the one or more reserved metadata areas;
each of the one or more verified area legends is configured to describe a corresponding area of the one or more reserved metadata areas;
each of the one or more verified area legends is configured to indicate a size of a node for a corresponding area of the one or more reserved metadata areas; and
the dedicated namespace is different from the one or more reserved metadata areas.

9. The machine-implemented method of claim 8, comprising:
when the requested number of the blocks of the write request is valid, determining whether a size of the blocks of the write request is equal to a multiple of a node size of the one or more verified area legends of the dedicated namespace,
wherein when the requested number of the blocks of the write request is valid and when the size of the blocks of the write request is equal to the multiple of the node size, the metadata of the write request is written to the one or more reserved metadata areas.

10. The machine-implemented method of claim 8, wherein the write request comprises the logical block address, a signature and a data type indication, and wherein the machine-implemented method comprises: presenting a notification indicating that the write request is not valid, in response to one or more of: determining that the write request does not comprise metadata based on the data type indication indicating metadata, determining that the signature does not match an expected signature of the one or more verified area legends, determining that the requested number of the blocks of the write request is not valid, or determining that a size of the blocks of the write request is not equal to a multiple of a node size of the one or more verified area legends of the dedicated namespace.

11. The machine-implemented method of claim 8, comprising:
responsive to determining the logical block address associated with the write request does not overlap the extent of the one or more verified area legends, determining that the write request comprises user data and not metadata based on a data type indication contained in the write request; and
responsive to determining that the write request comprises the user data, writing the user data to a storage device.

12. The machine-implemented method of claim 8, wherein a signature contained in the write request comprises a value that identifies a concrete metadata structure.

13. The machine-implemented method of claim 12, wherein the value of the signature is a pre-defined binary value.

14. The machine-implemented method of claim 8, wherein the write request comprises a byte stream.

15. The machine-implemented method of claim 8, wherein the one or more verified area legends are stored in a namespace associated with a file system volume of the storage system.

16. A storage system, comprising:
one or more memories comprising: one or more reserved metadata areas; and a dedicated namespace associated with the one or more reserved metadata areas;
one or more processors; and
prior to applying metadata changes:
means for using one or more verified area legends of the dedicated namespace for verifying a write request, wherein the verifying the write request comprises determining whether a logical block address associated with the write request overlaps an extent of the one or more verified area legends,
wherein the one or more processors are configured to cause:
prior to applying metadata changes:
when the logical block address overlaps the extent of the one or more verified area legends, determining whether the write request comprises metadata; and
when the write request comprises the metadata, determining whether a requested number of blocks of the write request is located only in the one or more reserved metadata areas; and
when the requested number of the blocks of the write request is located only in the one or more reserved metadata areas, writing the metadata of the write request to the one or more reserved metadata areas,
wherein:
the dedicated namespace is for storing the one or more verified area legends;
the one or more verified area legends are configured to describe information about the one or more reserved metadata areas;

the one or more verified area legends are for being generated based on a size of the one or more reserved metadata areas;

each of the one or more verified area legends is configured to describe a corresponding area of the one or more reserved metadata areas;

each of the one or more verified area legends is configured to indicate a size of a node for a corresponding area of the one or more reserved metadata areas; and the dedicated namespace is different from the one or more reserved metadata areas.

17. The storage system of claim 16, wherein the one or more processors are configured to cause: when a number of the blocks of the write request is valid, determining whether a size of the blocks of the write request is equal to a multiple of a node size of the one or more verified area legends of the dedicated namespace, wherein writing the metadata of the write request to the one or more reserved metadata areas comprises writing the metadata of the write request to the one or more reserved metadata areas when the number of the blocks of the write request is valid and when the size of the blocks of the write request is equal to the multiple of the node size.

18. The storage system of claim 16, wherein the write request comprises the logical block address, a signature and a data type indication, and wherein the one or more processors are configured to cause: presenting a notification indicating that the write request is not valid, in response to one or more of: determining that the write request does not comprise metadata based on the data type indication indicating metadata, determining that the signature does not match an expected signature of the one or more verified area legends, determining that the requested number of the blocks of the write request is not valid, or determining that a size of the blocks of the write request is not equal to a multiple of a node size of the one or more verified area legends of the dedicated namespace.

19. The storage system of claim 16, wherein the one or more processors are configured to cause:

responsive to determining the logical block address associated with the write request does not overlap the extent of the one or more verified area legends, determining that the write request comprises user data and not metadata based on a data type indication; and responsive to determining that the write request comprises the user data, writing the user data to a storage device.

20. The storage system of claim 16, wherein a signature contained in the write request comprises a value that identifies a concrete metadata structure.

* * * * *